(12) United States Patent
Moon

(10) Patent No.: US 10,815,061 B1
(45) Date of Patent: Oct. 27, 2020

(54) CONVEYOR BELT WITH REINFORCING BLOCK

(71) Applicant: SYNCRUDE CANADA LTD., Fort McMurray (CA)

(72) Inventor: Soon Won Moon, Edmonton (CA)

(73) Assignee: SYNCRUDE CANADA LTD., Fort McMurray (CA)

( * ) Notice: Subject to any disclaimer, the term of this patent is extended or adjusted under 35 U.S.C. 154(b) by 0 days.

(21) Appl. No.: 16/569,377

(22) Filed: Sep. 12, 2019

(51) Int. Cl.
*B65G 15/36* (2006.01)
*B65G 15/48* (2006.01)
*B65G 15/32* (2006.01)

(52) U.S. Cl.
CPC .......... *B65G 15/36* (2013.01); *B65G 15/32* (2013.01); *B65G 15/48* (2013.01); *B65G 2203/046* (2013.01)

(58) Field of Classification Search
CPC ........ B65G 15/30; B65G 15/32; B65G 15/34; B65G 15/36; B65G 15/48
USPC .......................................................... 198/847
See application file for complete search history.

(56) References Cited

U.S. PATENT DOCUMENTS

| | | | |
|---|---|---|---|
| 3,144,930 A * | 8/1964 | Michels ................ | B65G 15/34 198/847 |
| 3,973,670 A * | 8/1976 | Spaar .................... | B65G 15/36 198/847 |
| 4,928,812 A * | 5/1990 | van Calker ............ | B65G 15/36 198/847 |
| 5,609,242 A | 3/1997 | Hutchins et al. | |
| 5,868,639 A * | 2/1999 | Hormann ................ | F16G 1/28 198/845 |
| 6,029,801 A * | 2/2000 | Odin .................... | B65G 15/36 198/819 |
| 6,161,684 A * | 12/2000 | David ................... | B65G 15/34 198/847 |
| 2015/0203299 A1* | 7/2015 | Enshu .................. | B65G 15/34 198/847 |
| 2015/0232276 A1* | 8/2015 | Miyajima .............. | B65G 15/36 198/847 |

* cited by examiner

*Primary Examiner* — James R Bidwell
(74) *Attorney, Agent, or Firm* — Bennett Jones LLP

(57) ABSTRACT

A conveyor belt assembly includes an elastomer sheet, transversely spaced apart, longitudinally extending cords, and longitudinally spaced apart, transversely extending reinforcing blocks. The sheet has a top cover, and a bottom cover, and defines mutually longitudinal and transverse directions in the plane of the sheet. The cords and the blocks are embedded in the sheet between the top cover and the bottom cover. Each block encapsulates each of the cords in a transverse cross-section of the block. A method for making the conveyor belt assembly includes placing separate first and second portions of each block in abutting relationship with each other and around the cord, placing an uncured elastomer for forming the sheet around the cords and the block, and curing the elastomer for forming the sheet to form the sheet.

22 Claims, 4 Drawing Sheets

CONVEYOR BELT WITH REINFORCING BLOCK

FIELD OF THE INVENTION

The present invention relates to conveyor belts.

BACKGROUND OF THE INVENTION

A conventional rubber conveyor belt is reinforced with a layer of longitudinal steel cords (i.e., having an elongate dimension in the direction parallel to the belt travel direction) to sustain the required belt tension during operation. Such a conveyor belt may fail suddenly and catastrophically due to rapid propagation of longitudinal rips in the unreinforced portions of the rubber conveyor belt between adjacent steel cords. Such rips may be initiated by hard and sharp material (e.g., tramp metal or rocks) being wedged in a conveyor belt structure and acting like a knife to form a gouge or cut a slit in the moving conveyor belt. Such rips can also be initiated by impact loading of material on the conveyor belt, side-tracking of the conveyor belt, or bending of the conveyor belt over contaminated pulleys.

Rip propagation resistance of a conventional conveyor belt may be increased by providing additional reinforcement in the cover above and below the layer of longitudinal steel cords. The reinforcement may be in the form of transverse cords (i.e., having an elongated dimension in the direction perpendicular to the belt travel direction, in the plane of the belt), or a breaker in the form of a wire mesh or woven fabric having both transverse and longitudinal elements. (For examples, see U.S. Pat. No. 5,609,242 (Hutchins et al.; 1997-03-11), and the Phoenocord™ conveyor belt (Phoenix CBS GmbH; Germany). However, such a conveyor belt still remains susceptible to propagation of longitudinal rips. Once rip propagation commences, the additional reinforcement may not be strong enough to resist rip propagation. In theory, the material and amount of additional reinforcement may be selected to achieve a desired rip propagation resistance. In practice, however, these selections are limited by the factors such as the desired weight, flexibility, dimensions, and cost of the conveyor belt.

In order to detect rips in conveyor belts, an electrically conductive wire in the form of an inductive loop may be embedded into the conveyor belt. A transmitter external to the belt inductively excites the inductive loop to emit an output signal. Damage to the inductive loop results in an "open circuit" condition, which is inferentially detected as a change or absence of the output signal by a receiver external to the belt. The receiver may be operatively connected to a power source to shut down the conveyor belt upon the receiver detecting an "open circuit" condition. Alternatively, radio-frequency identification (RFID) tags having unique identifiers may be embedded in the conveyor belt, and interrogated using a reader that transmits interrogating radio waves. Damage or loss of the RFID tag is inferentially detected by an absence of an expected identifier by a RFID tag reader. However, these approaches are susceptible to false detection of rips because the inductive loop or RFID tag may be damaged or lost without a rip being formed in the conveyor belt. Also, a damaged inductive loop or RFID tag must be replaced or repaired before the detection system can be fully operational.

Accordingly, there is a need in the art for a conveyor belt that is resistant to rip propagation. There is also a need in the art for robust and reliable technologies for detecting rips in conveyor belts.

SUMMARY OF THE INVENTION

In one aspect, the present invention comprises a conveyor belt assembly comprising: an elastomer sheet, a plurality of transversely spaced apart, longitudinally extending cords, and a plurality of longitudinally spaced apart, transversely extending reinforcing blocks. The elastomer sheet comprises a top cover, and a bottom cover, and defines mutually longitudinal and transverse directions in the plane of the sheet. The cords are embedded in the sheet between the top cover and the bottom cover. The blocks are embedded in the sheet between the top cover and the bottom cover. Each block encapsulates each of the cords in a transverse cross-section of the block.

In another aspect, the present invention comprises a method of making a conveyor belt assembly comprising an elastomer sheet comprising a top cover, and a bottom cover, and defining mutually longitudinal and transverse directions in the plane of the sheet. The method comprises the steps of:
  (a) providing a plurality of transversely spaced apart, longitudinally extending cords;
  (b) forming a transversely extending reinforcing block that encapsulates each of the cords in a transverse cross-section of the block by placing separate first and second portions of the reinforcing block in abutting relationship with each other and around the cords;
  (c) placing an uncured elastomer for forming the sheet around the cords and the block, such that the cords and the block will be in an embedded position in the sheet between the top cover and the bottom cover; and
  (d) curing the elastomer for forming the sheet, thereby forming the sheet and fixing the embedded position of the cords and the block in the sheet between the top cover and the bottom cover.

In one embodiment of the method, step (b) is repeated to form plurality of reinforcing blocks longitudinally spaced apart from each other.

In one embodiment of the method, prior to step (d), the block comprises an uncured matrix, and step (d) comprises simultaneously curing the elastomer for forming the sheet and curing the uncured matrix of the block.

In one embodiment of the conveyor belt assembly or the method, each of the blocks comprises a plurality of sections, wherein each section encapsulates at least one of the cords in a transverse cross-section of the section.

In one embodiment of the conveyor belt assembly or the method, the blocks comprise a matrix and at least one reinforcing element. The matrix may comprise a polymer such as an elastomer such as a rubber or a polyurethane, a thermoplastic polymer, or a thermosetting polymer. The at least one reinforcing element may comprise a metal alloy, an inorganic material such as glass fiber, or a polymer such as a polyester, a nylon, or an aramid. The at least one reinforcing element may be in the form of one or a combination of a reinforcing fiber, pulp, or particle filler intermingled with the matrix. The at least one reinforcing element may comprise at least one transversely extending cord. The at least one reinforcing element may comprise at least one transversely extending sheet. The at least reinforcing element may comprise a plurality of transversely extending cords or sheets, wherein the cords or sheets are distributed either longitudinally or vertically, or both longitudinally and vertically, within the block.

In one embodiment of the conveyor belt assembly or the method, a leading surface of block is sloped or curved, so as to be at an acute angle to a transverse plane, for deflecting a foreign object.

In one embodiment of the conveyor belt assembly or the method, the assembly further comprises one or a combination of an inductive loop of electrically conductive wire, and an RFID tag, embedded in one of the blocks. In the case of the method, one or a combination of an inductive loop of electrically conductive wire, and an RFID tag, may be embedded in the block, prior to step (d) of curing the elastomer for forming the sheet.

BRIEF DESCRIPTION OF THE DRAWINGS

In the drawings shown, like elements may be assigned like reference numerals. The drawings are not necessarily to scale, with the emphasis instead placed upon the principles of the present invention. Additionally, each of the embodiments depicted are but one of a number of possible arrangements utilizing the fundamental concepts of the present invention.

DETAILED DESCRIPTION OF EMBODIMENTS OF THE INVENTION

Definitions

Figure 1:
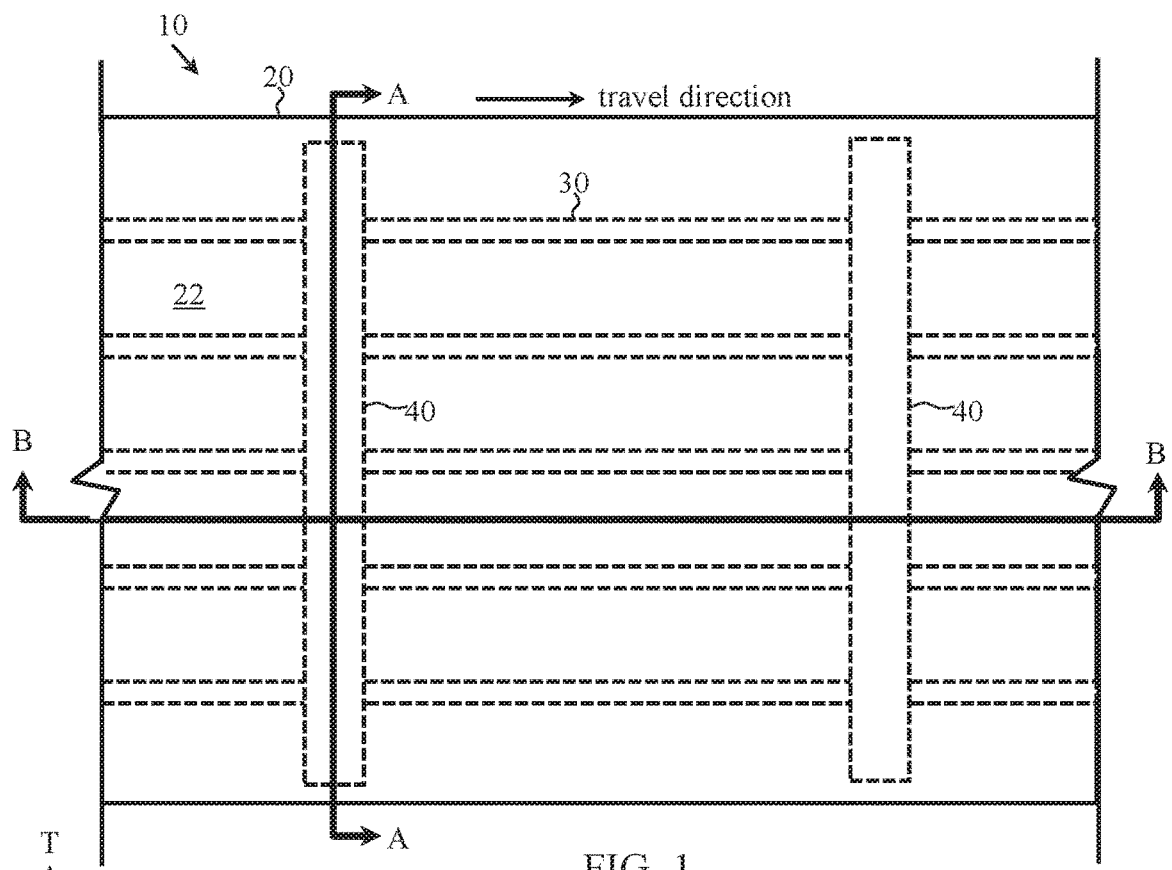
FIG. 1 shows a top view of a first embodiment of a conveyor belt of the present invention, with hidden internal elements shown in dashed line.

The present invention relates to a conveyor belt. Any term or expression not expressly defined herein shall have its commonly accepted definition understood by a person skilled in the art. As used herein, the following terms have the following meanings.

"Elastomer" refers to any polymeric material exhibiting viscoelasticity. Non-limiting examples of elastomers include one or a combination of natural rubber materials, synthetic rubber materials, and polyurethane.

"Tensile strength" refers to the resistance of a material to breaking under tension, as measured based on force per unit area of the material.

Conveyor Belt Assembly.

As shown in embodiments in the Figures, a conveyor belt assembly (10) of the present invention includes an elastomer sheet (20), a plurality of transversely spaced apart, longitudinally extending cords (30), and a plurality of longitudinally spaced apart, transversely extending reinforcing blocks (40). The elastomer sheet (20) comprises a top cover (22), and a bottom cover (24), and defines mutually longitudinal and transverse directions (L, T) in the plane of the sheet (20). The cords (30) are embedded in the sheet (20) between the top cover (22) and the bottom cover (24). The blocks (40) are embedded in the sheet (20) between the top cover (22) and the bottom cover (24). Each block (40) encapsulates each of the cords (30) in a transverse cross-section of the block (40) (see FIGS. 2, 4, 7, and 11). Embodiments of the conveyor belt assembly (10) are described in detail below.

First Embodiment of the Conveyor Belt Assembly

Figure 2:
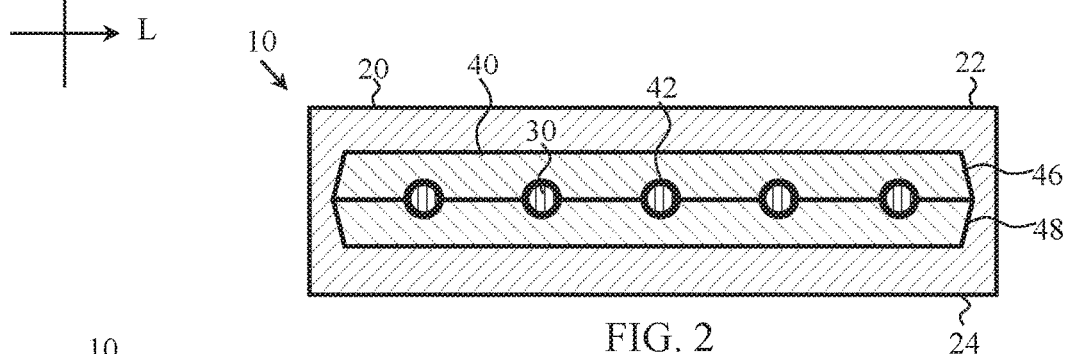
FIG. 2 shows a transverse cross-section of the conveyor belt of FIG. 1 along section line A-A.
Figure 3:
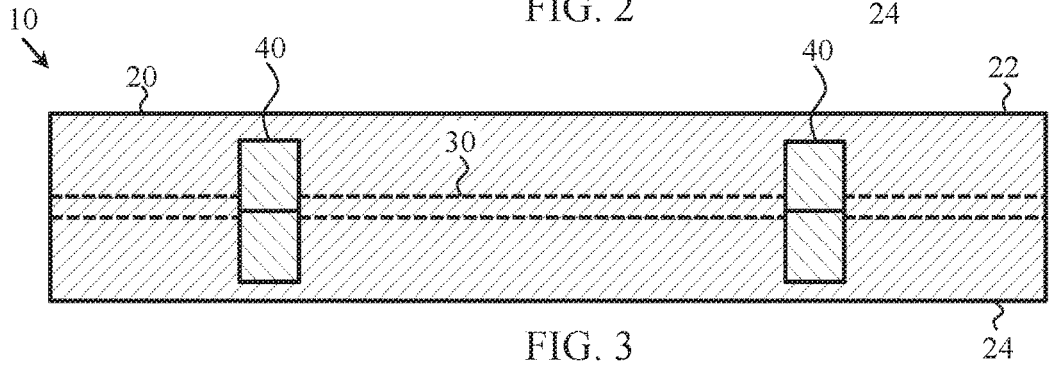
FIG. 3 shows a longitudinal cross-section of the conveyor belt of FIG. 1 along section line B-B, with hidden internal elements shown in dashed line.

FIGS. 1 to 3 show a top view, transverse cross-sectional view, and a longitudinal cross-sectional view, respectively, of a first embodiment of a conveyor belt assembly (10) of the present invention. The conveyor belt assembly (10) includes a cured elastomer sheet (20). The sheet (20) has a top cover (22) that defines a top surface for contacting a load, and a bottom cover (24) that defines a bottom surface for contact with a drive pulley (not shown). The planar dimension of the sheet (20) defines a longitudinal direction and a transverse direction that are parallel and perpendicular, respectively, to an intended travel direction of the sheet (20) when driven by the drive pulley. Referring to FIG. 1, the "longitudinal" direction, denoted by the reference axis (L), refers to the direction parallel to an intended travel direction of the sheet (20) when driven by a drive pulley; the "transverse" direction, denoted by the reference axis (T), refers to the direction perpendicular to the intended travel direction of the sheet (20) when driven by a drive pulley.

To enhance the longitudinal tensile strength of the belt assembly (10), the sheet (20) is reinforced by a plurality of transversely spaced apart, longitudinally extending cords (30) embedded in the core region between the top cover (22) and the bottom cover (24) of the sheet (20). The number, size, transverse spacing, and material properties of the longitudinally extending cords (30) may be selected by a person skilled in the art to achieve a desired tensile strength for the conveyor belt assembly (10). The longitudinally extending cords (30) may be any elongate member that is sufficiently flexible to allow the sheet (20) to be wrapped around the drive pulley and an idler in a conveyor belt assembly (10) system. As non-limiting examples, the longitudinally extending cords (30) may include members in the form of stranded or non-stranded cables or wires, and the like. As non-limiting examples, the longitudinally extending cords (30) may be made of a variety materials such as metal alloys (e.g., steel) or polymers (e.g., a polyester, or a nylon, including in particular, an aramid such as Kevlar™).

To enhance the resistance to longitudinal rip propagation of the belt assembly (10), the sheet (20) is reinforced transversely by a plurality of elongate, transversely extending reinforcing blocks (40), which are longitudinally spaced apart along the belt length. The reinforcing blocks (40) are embedded in the sheet (20) between the top cover (22) and the bottom cover (24) of the sheet (20). The number, size, longitudinal spacing, and material properties of the blocks (40) may be selected by a person skilled in the art to achieve a desired resistance to rip propagation for the conveyor belt assembly (10). In the embodiment shown in FIG. 1, multiple reinforcing blocks (40) are placed apart along the belt length. Placing more blocks (40) at shorter longitudinal intervals may increase the resistance to rip propagation of the sheet (20). In the embodiment shown in FIG. 1, a single block (40) extends transversely across the majority of the transverse dimension of the sheet (20). In other embodiments (not shown), each of the blocks (40) may be formed by multiple sections that collectively span transversely across the majority of the transverse dimension of the sheet (20). In the embodiment shown in FIG. 1, the longitudinal dimension of the block (40) is relatively small relative to the longitudinal length of the sheet (20) so that the block (40) does not substantially interfere with bending of the sheet (20) around the pulleys. At the same time, for certain applications, the elasticity of the block (40) may preferably be as similar as possible to the elasticity of the elastomer forming the sheet (20) so that the block (40) does not interfere with the ability of the sheet (20) to form a trough in the transverse direction over idlers.

In one embodiment, the reinforcing blocks (40) are composed of a matrix with an embedded reinforcing element. As non-limiting examples, the matrix forming the block (40) may be a polymer, which include elastomers such as rubbers, polyurethanes, etc., thermoplastic polymers, and thermosetting polymers. In order for the block (40) to enhance the longitudinal rip resistance of the sheet (20), the transverse tensile strength of the block (40) should be greater than the transverse tensile strength of the elastomer forming the sheet (20). This can be achieved mainly through the provision of the reinforcing element: that is, the transverse tensile strength of the matrix of the block (40) may be enhanced by embedding reinforcing elements in the block (40). In the embodiment shown in FIG. 2, the embedded reinforcing elements are not visibly shown, but comprise a reinforcing filler material intermingled with the matrix that forms the bulk of the block (40). In embodiments, this allows the mechanical properties of matrix to be the same as or similar to that of the elastomer of the sheet (20), while achieving the desired effect of the block (40) having a greater transverse tensile strength than that of the sheet (20). Reinforcing filler materials are known to persons skilled in the art. Non-limiting examples include relatively short reinforcing fibers (e.g., metal alloy fibers, chopped inorganic fibers, polymer fibers), reinforcing pulps (e.g., fibrillated aramid pulp), and reinforcing particles (e.g., amorphous silica, carbon black, and nanostructured particles).

Referring to FIG. 2, the block (40) is profiled to encapsulate the cords in a transverse cross-section of the block (40). In this embodiment, the block (40) has a plurality of transversely spaced apart, longitudinally extending apertures (42) between an upper end of the block (40) and a lower end of the block (40). Each of the plurality of longitudinally extending cords (30) passes through a different one of the longitudinally extending apertures (42). Therefore, portions of the block (40) are disposed transversely between adjacent longitudinally extending cords (30), and the block (40) extends both above and below the longitudinally extending cords (30).

In embodiments, a further purpose of the block (40) may be to deflect, out of a sheet (20), a foreign object that has penetrated into the sheet (20), to limit rip propagation of the sheet (10). When the foreign object embedded into the sheet (20) meets one of the reinforcing blocks (40) during the belt travel, the foreign object should experience a "hammering effect" due to a large difference in transverse reinforcement (e.g., transverse tensile strength) between the region of the sheet (20) with reinforcing blocks (40) and the other regions without reinforcing blocks (40). This should facilitate the deflection of the embedded foreign object, leading to ejection of the foreign object from the sheet (20) and mitigation of rip propagation of the sheet (20). This aspect is further discussed below with reference to a fourth embodiment of the conveyor belt assembly (10) shown in FIG. 10.

Second Embodiment of the Conveyor Belt Assembly

Figure 4:
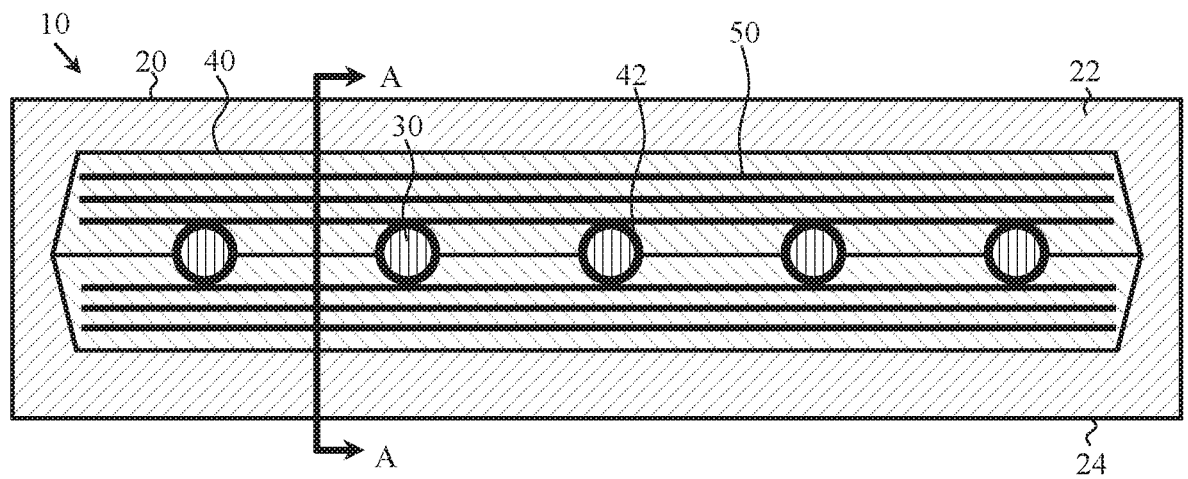
FIG. 4 shows a transverse cross-section of a second conveyor belt of the present invention.
Figure 5:
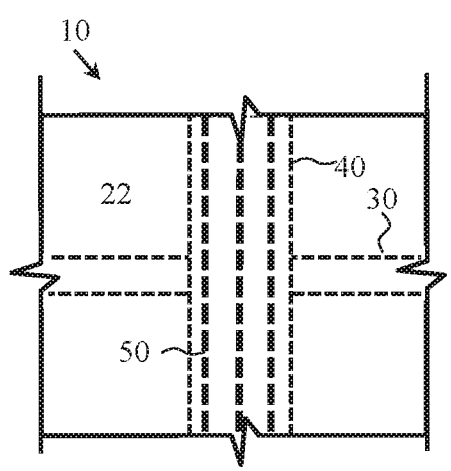
FIG. 5 shows a top view of a portion of the conveyor belt of FIG. 4, with hidden internal elements shown in dashed line.
Figure 6:
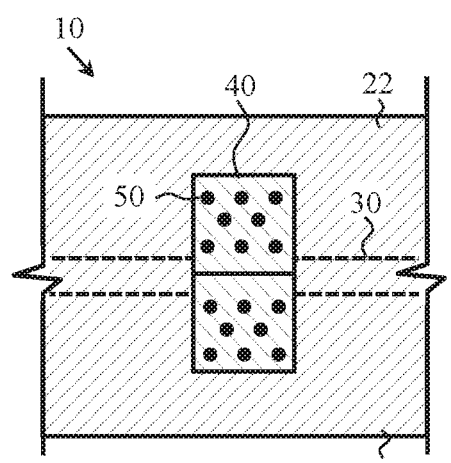
FIG. 6 shows a longitudinal cross-section of the conveyor belt of FIG. 4 along section line A-A, with hidden internal elements shown in dashed line.

FIGS. 4 to 6 show a transverse cross-sectional view, a partial top view, and a partial longitudinal cross-sectional view, respectively, of a second embodiment of a conveyor belt assembly (10) of the present invention. The second embodiment is similar to the first embodiment shown in FIGS. 1 to 3, except that the reinforcing elements embedded in the block (40) are in the form of a plurality of transversely extending cords (50) to achieve the desired effect of the reinforced block (40) having a greater transverse tensile strength than that of the sheet (20). The number, size, spacing, and material properties of the transversely extending cords (50) may be selected by a person skilled in the art to achieve a desired transverse tensile strength. In the embodiment shown in FIGS. 4 to 6, the transversely extending cords (50) are distributed longitudinally through the block (40), and distributed in vertically spaced apart layers. This may help to preserve the flexibility of sheet (20), in comparison to a single transversely extending cord having an equivalent amount of reinforcing material. As non-limiting examples, the transversely extending cords (50) may include members in the form of stranded or non-stranded cables or wires, and the like. As non-limiting examples, the transversely extending cords (50) may be made of a variety materials such as metal alloys (e.g., steel), inorganic material (e.g., glass fibers) or polymers (e.g., a polyester, or a nylon, including in particular, an aramid such as Kevlar™). In order for the transversely extending cords (50) to enhance the transverse tensile strength of the block (40), the tensile strength of the material forming the transversely extending cords (50) should be greater than the tensile strength of the matrix forming the block (40).

Third Embodiment of the Conveyor Belt Assembly

Figure 7:
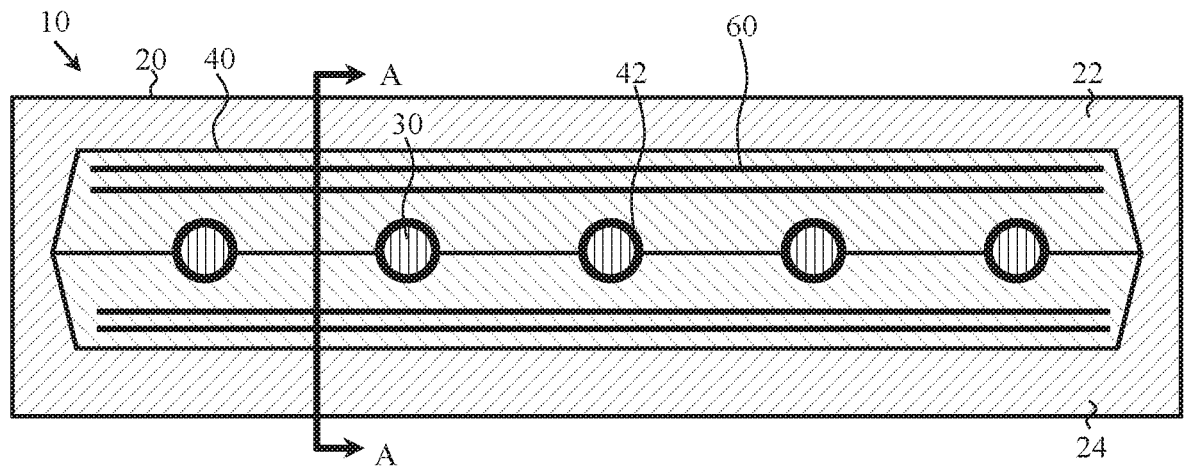
FIG. 7 shows a transverse cross-section of a third conveyor belt of the present invention.
Figure 8:
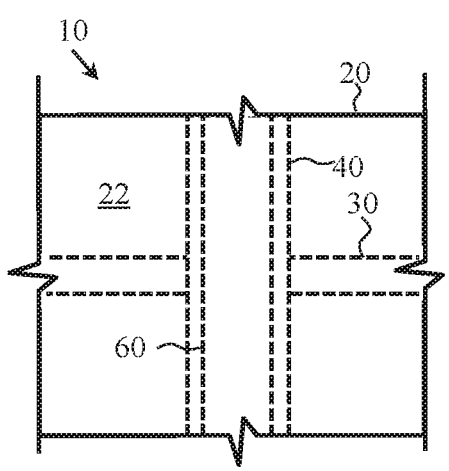
FIG. 8 shows a top view of a portion of the conveyor belt of FIG. 7, with hidden internal elements shown in dashed line.
Figure 9:
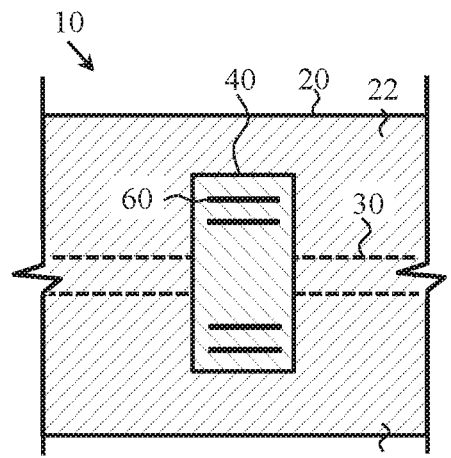
FIG. 9 shows a longitudinal cross-section of the conveyor belt of FIG. 7 along section line A-A, with hidden internal elements shown in dashed line.

FIGS. 7 to 9 show a transverse cross-sectional view, a partial top view, and a partial longitudinal cross-sectional view, respectively, of a third embodiment of a conveyor belt assembly (10) of the present invention. The third embodiment is similar to the second embodiment shown in FIGS. 4 to 6, except that the reinforcing elements embedded in the block (40) are a plurality of transversely extending sheets (60) to achieve the desired effect of the reinforced block (40) having a greater transverse tensile strength than that of the sheet (20). As non-limiting examples, the transversely extending sheets (60) may include members in the form of a wire mesh or woven fabric having both transverse and longitudinal elements. As non-limiting examples, the transversely extending sheets (60) may be made of a variety materials such as metal alloys (e.g., steel), inorganic material (e.g., glass fiber) or polymers (e.g., a polyester, or a nylon, including in particular, an aramid such as Kevlar™). In order for the transversely extending sheets (60) to enhance the transverse tensile strength of the block (40), the tensile strength of the material forming the transversely extending sheets (60) should be greater than the tensile strength of the matrix forming the block (40).

Fourth Embodiment of the Conveyor Belt Assembly

Figure 10:
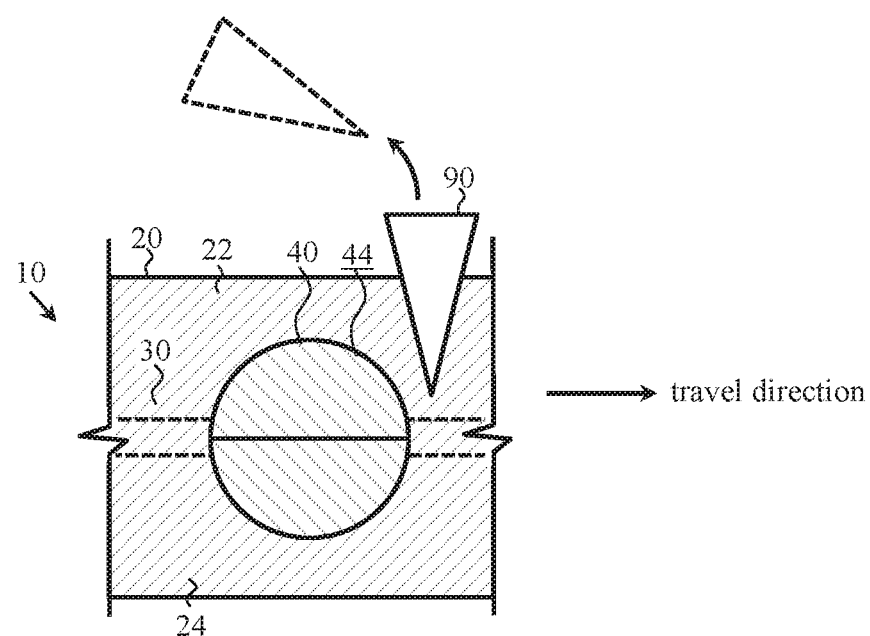
FIG. 10 shows a longitudinal cross-section of the conveyor belt of fourth embodiment of a conveyor belt of the present invention, with hidden internal elements shown in dashed line, in relation to a foreign object.

FIG. 10 shows a partial longitudinal cross-sectional view of a fourth embodiment of a conveyor belt assembly (10) of the present invention. The fourth embodiment is similar to the first embodiment shown in FIGS. 1 to 3, except that the longitudinal cross-section of the block (40) has an elliptical, circular, or angled (e.g., wedge) shape rather than a rectangular shape, such that the leading surface of the block (40) is at an acute angle to the plane defined by the sheet (20). In FIG. 10, the leading surface (44) of the elliptical shaped block (40) is sloped and curved for tilting and deflecting a foreign object (90) (e.g., a piece of tramp metal, or a rock), when the conveyor belt assembly (10) travels toward the foreign object (90), and the block (40) comes into contact with the foreign object (90). Accordingly, the block (40) with a sloped or curved leading surface (44) should further facilitate the deflection and ejection of the foreign object (90) (as shown by the curved arrow line, and the foreign object in dashed line), thereby helping to prevent the foreign object (90) from extending a gouge or cutting a slit into the sheet (20). In other embodiments, the sloped or curved leading surface (44) of the block (40) may be implemented by shapes other than elliptical or circular shapes.

Fifth Embodiment of the Conveyor Belt Assembly

Figure 11:
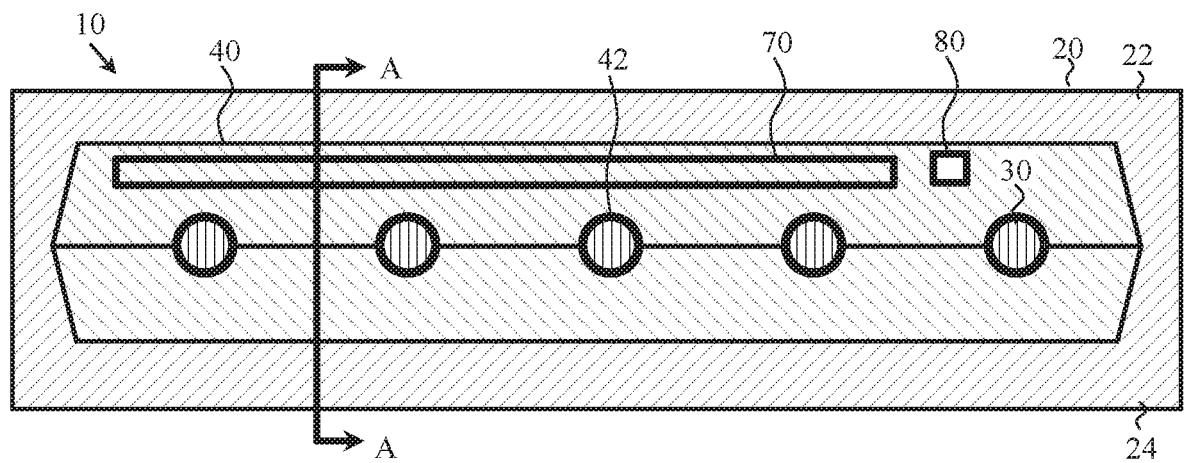
FIG. 11 shows a transverse cross-section of a fifth embodiment of a conveyor belt of the present invention.

FIG. 11 shows a transverse cross-sectional view of a fifth embodiment of a conveyor belt assembly (10) of the present invention. The fifth embodiment is similar to the first embodiment shown in FIGS. 1 to 3, except that an inductive loop (70) and an RFID tag (80) are embedded into the block (40). The inductive loop (70) may be used in conjunction with a transmitter and a receiver in a manner similar to the use of inductive loops embedded into conventional rubber conveyor belts (10), as described in the above section under the heading "Background of the Invention. The RFID tag (80) may be used in conjunction with a RFID reader, to detect rips in the conveyor belt assembly (10) in a manner similar to the use of RFID tags embedded into conventional rubber conveyor belts (10), as described in the above section under the heading "Background of the Invention". However, the present invention may be relatively advantageous because, by positioning the inductive loop (70) and RFID tag (80) deeper within the sheet (20), and closer to the anticipated rip propagation path, they may be better protected from phenomena that would otherwise damage the inductive loop (70) and RFID tag (80), but not rip the conveyor belt assembly (10). In addition, the inductive loop (70) and RFID tag (80) installed inside the reinforcing block (40) may be better protected from impact or cut damage since the block (40) with reinforcing element should show better impact or cut resistance than the elastomer comprising the sheet (20). This may help to avoid false detection of rips in the conveyor belt assembly (10).

Additional Embodiments of the Conveyor Belt Assembly

Two or more features of the first through fifth embodiments of the conveyor belts (10) described above may be selectively combined with each other.

Method of manufacturing the conveyor belt assembly.

The embodiments of the conveyor belt assemblies (10) described above may be manufactured in accordance with a method that includes the steps of:

(a) providing a plurality of transversely spaced apart, longitudinally extending cords (30);

(b) forming a transversely extending reinforcing block (40) that encapsulates each of the cords (30) in a transverse cross-section of the block (40) by placing separate first and second portions (46, 48) of the reinforcing block (40) in abutting relationship with each other and around the cords (30);

(c) placing an uncured elastomer for forming the sheet (20) around the cords (30) and the block (40), such that the cords (30) and the block (40) will be in an embedded position in the sheet (20) between the top cover (22) and the bottom cover (44); and (d) curing the elastomer for forming the sheet (20), thereby forming the sheet (20) and fixing the embedded position of the cords (30) and the block (40) in the sheet (20) between the top cover (22) and the bottom cover (24).

In the embodiments shown in the Figures, each of the blocks (40) is formed by a first lower portion (46) and a second lower portion (48) that are separate from each other prior to making the conveyor belt assembly (10). The first and second portions (46, 48) are placed around the longitudinally extending cords (30), and in abutting relationship with each other to define the plurality of longitudinally extending apertures (42). The longitudinally extending cords (30), the blocks (40), and the elastomer for forming the sheet (20) are placed in a mold (not shown) defining the shape of the sheet (20). The method is not limited by the sequence of their placement in the mold. The elastomer for forming the sheet (20) is then cured. When the elastomer for forming the sheet (20) is cured, the longitudinally extending cords (30), and the block (40) are fixed in position within the sheet (20). In embodiments of the method, the matrix that forms the block (40) may be uncured before curing of the elastomer for forming the sheet (20). In other embodiments, curing the elastomer for forming the sheet (20) may simultaneously involve curing the matrix that forms the block (40). In embodiments of the method, curing the elastomer that forms the sheet and curing the matrix may involve subjecting them to elevated temperature and pressure (e.g., using a hot press), and vulcanizing the elastomers, as known to persons skilled in the art. In embodiments of the method, the curing of the portions may cause the sheet (20) to fuse with the block (40) into a single unit. The two portions (46, 48) of the block (40) may remain separate from each other. Alternatively, the curing may cause the two portions (46, 48) of the block (40) to fuse together into a single monolithic unit. This may be advantageous in enhancing the interlocking of the block (40) within the belt (20).

Interpretation.

The corresponding structures, materials, acts, and equivalents of all means or steps plus function elements in the claims appended to this specification are intended to include any structure, material, or act for performing the function in combination with other claimed elements as specifically claimed.

References in the specification to "one embodiment", "an embodiment", etc., indicate that the embodiment described may include a particular aspect, feature, structure, or characteristic, but not every embodiment necessarily includes that aspect, feature, structure, or characteristic. Moreover, such phrases may, but do not necessarily, refer to the same embodiment referred to in other portions of the specification. Further, when a particular aspect, feature, structure, or characteristic is described in connection with an embodiment, it is within the knowledge of one skilled in the art to affect or connect such module, aspect, feature, structure, or characteristic with other embodiments, whether or not explicitly described. In other words, any module, element or feature may be combined with any other element or feature in different embodiments, unless there is an obvious or inherent incompatibility, or it is specifically excluded.

It is further noted that the claims may be drafted to exclude any optional element. As such, this statement is intended to serve as antecedent basis for the use of exclusive terminology, such as "solely," "only," and the like, in connection with the recitation of claim elements or use of a "negative" limitation. The terms "preferably," "preferred," "prefer," "optionally," "may," and similar terms are used to indicate that an item, condition or step being referred to is an optional (not required) feature of the invention.

The singular forms "a," "an," and "the" include the plural reference unless the context clearly dictates otherwise. The term "and/or" means any one of the items, any combination of the items, or all of the items with which this term is associated. The phrase "one or more" is readily understood by one of skill in the art, particularly when read in context of its usage.

The term "about" can refer to a variation of ±5%, ±10%, ±20%, or ±25% of the value specified. For example, "about 50" percent can in some embodiments carry a variation from 45 to 55 percent. For integer ranges, the term "about" can include one or two integers greater than and/or less than a recited integer at each end of the range. Unless indicated otherwise herein, the term "about" is intended to include values and ranges proximate to the recited range that are equivalent in terms of the functionality of the composition, or the embodiment.

As will be understood by one skilled in the art, for any and all purposes, particularly in terms of providing a written description, all ranges recited herein also encompass any and all possible sub-ranges and combinations of sub-ranges thereof, as well as the individual values making up the range, particularly integer values. A recited range includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third and upper third, etc.

As will also be understood by one skilled in the art, all language such as "up to", "at least", "greater than", "less than", "more than", "or more", and the like, include the number recited and such terms refer to ranges that can be subsequently broken down into sub-ranges as discussed above. In the same manner, all ratios recited herein also include all sub-ratios falling within the broader ratio.

The claimed invention is:

1. A conveyor belt assembly comprising:
   (a) an elastomer sheet comprising a top cover, and a bottom cover, and defining mutually longitudinal and transverse directions in the plane of the sheet;
   (b) a plurality of transversely spaced apart, longitudinally extending cords embedded in the sheet between the top cover and the bottom cover; and
   (c) a plurality of longitudinally spaced apart, transversely extending reinforcing blocks embedded in the sheet between the top cover and the bottom cover, wherein each block encapsulates each of the cords in a transverse cross-section of the block, and wherein a transverse tensile strength of the blocks is greater than a transverse tensile strength of the elastomer sheet.

2. The conveyor belt assembly of claim 1, wherein each of the blocks comprises a plurality of sections, wherein each section encapsulates at least one of the cords in a transverse cross-section of the section.

3. The conveyor belt assembly of claim 2, wherein the blocks comprise a matrix and at least one reinforcing element.

4. The conveyor belt assembly of claim 3, wherein the matrix comprises a polymer such as an elastomer such as a rubber or a polyurethane, a thermoplastic polymer, or a thermosetting polymer.

5. The conveyor belt assembly of claim 4, wherein the at least one reinforcing element comprises a metal alloy, an inorganic material such as glass fiber, or a polymer such as a polyester, a nylon, or an aramid.

6. The conveyor belt assembly of claim 5, wherein the at least one reinforcing element is in the form of one or a combination of a reinforcing fiber, pulp, or particle filler intermingled with the matrix.

7. The conveyor belt assembly of claim 6, wherein the at least one reinforcing element comprises at least one transversely extending cord.

8. The conveyor belt assembly of claim 7, wherein the at least one reinforcing element comprises at least one transversely extending sheet.

9. The conveyor belt assembly of claim 8, wherein the at least reinforcing element comprises a plurality of transversely extending cords or sheets, wherein the cords or sheets are distributed, either longitudinally or vertically, or both longitudinally and vertically, within the block.

10. The conveyor belt assembly of claim 1, wherein a leading surface of block is sloped or curved, to be at an acute angle to a transverse plane, for deflecting a foreign object.

11. The conveyor belt assembly of claim 1, further comprising one or a combination of an inductive loop of electrically conductive wire, and an RFID tag, embedded in one of the blocks.

12. A method of making a conveyor belt assembly comprising an elastomer sheet comprising a top cover, and a bottom cover, and defining mutually longitudinal and transverse directions in the plane of the sheet, and the method comprising the steps of:
   (a) providing a plurality of transversely spaced apart, longitudinally extending cords;
   (b) forming a transversely extending reinforcing block that encapsulates each of the cords in a transverse cross-section of the block by placing separate first and second portions of the reinforcing block in abutting relationship with each other and around the cords;
   (c) placing an uncured elastomer for forming the sheet around the cords and the block, such that the cords and the block will be in an embedded position in the sheet between the top cover and the bottom cover; and
   (d) curing the elastomer for forming the sheet, thereby forming the sheet and fixing the embedded position of the cords and the block in the sheet between the top cover and the bottom cover.

13. The method of claim 12, wherein step (b) is repeated to form plurality of reinforcing blocks longitudinally spaced apart from each other.

14. The method of claim 13, wherein prior to step (d), the block comprises an uncured matrix, and step (d) comprises simultaneously curing the elastomer for forming the sheet and curing the uncured matrix of the block.

15. The method of claim 14, wherein the block comprises a matrix reinforced with at least one reinforcing element embedded in the block.

16. The method of claim 15 wherein the at least one reinforcing element comprises a metal alloy, an inorganic material such as glass fiber, or a polymer, such as a polyester, a nylon, or an aramid.

17. The method of claim 16, wherein the at least one reinforcing element comprises one or a combination reinforcing fibers, a pulp or a particle filler, intermingled with the matrix of the block.

18. The method of claim 17, wherein the at least one reinforcing element comprises at least one transversely extending cord.

19. The method of claim 18, wherein the at least one reinforcing element comprises at least one transversely extending sheet.

20. The method of claim 19, wherein the at least reinforcing element comprises a plurality of transversely extending cords or sheets, wherein the cords or sheets are distributed, either longitudinally or vertically, or both longitudinally and vertically, within the block.

21. The method of claim 12, wherein a leading surface of block is sloped or curved, to be at an acute angle to a transverse plane, for deflecting a foreign object.

22. The method of claim 12, wherein one or a combination of an inductive loop of electrically conductive wire, and an RFID tag, are embedded in the block, prior to step (d) of curing the elastomer for forming the sheet.

* * * * *